United States Patent [19]
Kunik

[11] Patent Number: 5,416,822
[45] Date of Patent: May 16, 1995

[54] DEVICE FOR REGISTERING A DENTAL RADIOGRAPH HAVING DISTORTION MEASURING CAPABILITY AND METHOD FOR USING THE SAME

[76] Inventor: Randall L. Kunik, 1401 Bowie Rd., Austin, Tex. 78733

[21] Appl. No.: 296,583

[22] Filed: Aug. 29, 1994

[51] Int. Cl.$^6$ .............................................. A61B 6/14
[52] U.S. Cl. .................... 378/162; 378/168; 378/170
[58] Field of Search ............... 378/167, 168, 170, 162, 378/163, 205, 187, 204

[56] References Cited

U.S. PATENT DOCUMENTS

| | | | |
|---|---|---|---|
| 4,554,676 | 11/1985 | Maldonado et al. | 378/170 |
| 4,598,416 | 7/1986 | Donato | 370/168 |
| 4,941,164 | 7/1990 | Schuller et al. | 378/205 |
| 4,949,370 | 8/1990 | Tanaka | 378/170 |
| 4,995,108 | 2/1991 | Tanaka | 378/168 |
| 5,090,047 | 2/1992 | Angotti et al. | 378/170 |
| 5,289,522 | 2/1994 | Kanbar et al. | 378/170 |

*Primary Examiner*—David P. Porta
*Assistant Examiner*—Don Wong
*Attorney, Agent, or Firm*—Minh-Hien N. Clark

[57] ABSTRACT

The accuracy of pre-treatment radiographic images is improved by standardizing a technique for placing a bite block in a patient's mouth, by minimizing distortion in the resulting radiograph, and by providing a means for measuring the remaining distortion in the radiographic image. The placement of the bite block is registered on study models prior to the taking of the radiograph such that the dental practitioner can predetermine the best possible position for the bite block per individual patient outside the patient's mouth. The best possible position allows the dental practitioner to optimize the position of the bite block to obtain a radiograph having minimal vertical distortion and mesio-distal distortion. As some distortion is inevitable, the invention also allows for a means to measure the resulting distortion based on spatial markers set at a predetermined distance apart which are superimposed onto the radiographic image.

20 Claims, 2 Drawing Sheets ically. Furthermore, as many of the figures illustrate the same or substantially similar elements, like reference numerals will be used to designate elements that are the same or substantially similar in either shape or function.

DEVICE FOR REGISTERING A DENTAL RADIOGRAPH HAVING DISTORTION MEASURING CAPABILITY AND METHOD FOR USING THE SAME

FIELD OF THE INVENTION

The present invention relates to a dental x-ray block in general, and more specifically to a dental x-ray block for periapical x-rays having a distortion measuring capability and a method for using and making the same.

BACKGROUND OF THE INVENTION

Radiographic images are important in the field of dental implants for treating partially edentulous mouths. Dental implants are a means for restoring missing teeth and represent an alternative to removable dentures and fixed partial dentures to significantly improve a patient's dental health and quality of life. In the treatment plan, it is necessary for the practitioner to accurately determine whether sufficient space exists between two teeth and their roots in order to successfully implant a tooth in that edentulous space. Commonly, a successful anterior dental implant requires a minimum width between adjacent teeth of 6 mm (with a narrow margin of error) at the cemento-enamel junction. Additionally, the practitioner also needs to determine whether the patient has enough jawbone to support a dental implant. At least 10 mm of jawbone height is necessary. Radiographic images of the patient's mouth provide this information.

However, a problem with existing radiographic images is distortion in the images which limits the practitioner's ability to accurately determine the required measurements. Currently, periapical x-rays are typically taken with an XCP paralleling device by the Rinn Corporation. The XCP device allows a paralleling of the x-ray beam to the longitudinal axis of the bite block/film holder such that the x-ray beam will irradiate the film in a perpendicular manner. However, while the XCP allows a focusing of the x-ray beam onto the x-ray film, it does not provide any control over distortion of the radiographic image due to operator error and anatomical variances.

Distortion can take the form of either foreshortening or elongation due to palatal depth variations in different patients. A shallow palate would be most likely to cause a foreshortening of the root in the radiograph image due to the angle of the bite block in the patient's mouth once the patient bites down on the bite block. Similarly, a deep palatal vault may cause an elongation of the root in the radiograph image again due to the angle of the bite block in the patient's mouth. Another type of distortion frequently found in radiographic images is the mesio-distal distortion. The mesio-distal dimension becomes distorted due to any rotation of the bite block in the patient's mouth. If the x-ray cone is not pointed normal or perpendicular to the front surface of the teeth, then the adjacent tooth will cast a shadow on the radiographic image because it will be either closer to the cone or farther away from the cone than the tooth or spacing to be radiographed, depending on the angle of the cone. The resulting image causes the adjacent tooth to appear closer or farther away than the true spacing depending on the angle of the cone with respect to the tooth. Any distortion in the radiograph adversely affects the practitioner determination of actual jawbone height and edentulous spacing, thus introducing inaccuracy into the treatment process and hence increases risk to the patient.

Hence, a need exists for a method in which a dental practitioner can obtain radiographic images of a patient's teeth with minimal distortion and with a means to measure any remaining distortion in the images.

DETAILED DESCRIPTION OF A PREFERRED EMBODIMENT

Figure 1:
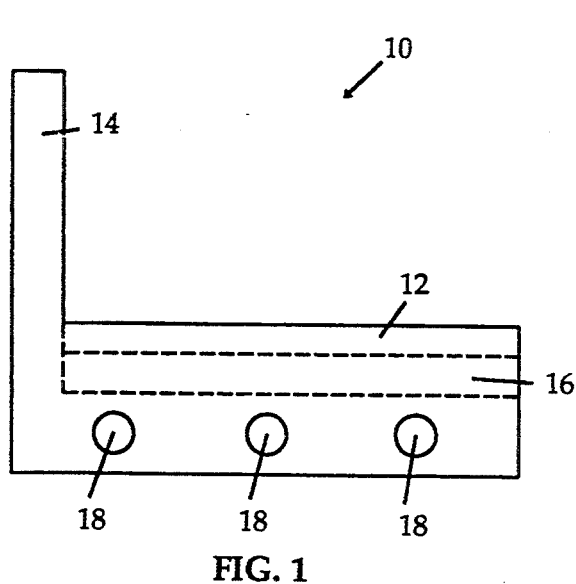
FIG. 1 illustrates, in a side view, a device for registering a dental radiograph in accordance with the invention.

The present invention improves the accuracy of pre-treatment radiographic images by standardizing a technique for placing a bite block in a patient's mouth, by minimizing distortion in the resulting radiograph, and by providing a means for measuring the remaining distortion in the radiographic image. The placement of the bite block is registered on study models prior to the taking of the radiograph such that the dental practitioner can predetermine the best possible position for the bite block per individual patient outside the patient's mouth. The best possible position allows the dental practitioner to optimize the position of the bite block to obtain a radiograph having minimal vertical distortion and mesio-distal distortion. As some distortion is inevitable, the invention also allows for a means to measure the resulting distortion based on spatial markers set at a predetermined distance apart which are superimposed onto the radiographic image.

These and other features, and advantages, will be more clearly understood from the following detailed description taken in conjunction with the accompanying drawings. It is important to point out that the illustrations may not necessarily be drawn to scale, and that there may be other embodiments of the present invention which are not specifically illustrated. Furthermore, as many of the figures illustrate the same or substantially similar elements, like reference numerals will be used to designate elements that are the same or substantially similar in either shape or function.

FIG. 1 illustrates, in a side view, a device 10 for registering a dental radiograph in accordance with the invention. The device 10 has a bite block 12 and an image receptor holder 14. The bite block 12 has a retentive groove 16 along a length of the bite block. The utility of the retentive groove will become apparent with subsequent discussion. Also in the bite block 12 is a plurality of indexing holes 18 in a bottom portion of the bite block. These indexing holes 18 are present for the purpose of allowing device 10 to be used in conjunction with existing paralleling radiographic equipment (not shown), such as the XCP device. The placement and number of indexing holes may vary depending on what type of radiographic equipment is used and is not critical to the present invention. The image receptor holder 14 is attached to one end of the bite block. This end is the distal end of the bite block when viewed from a radiographic source (not shown). The device 10 can be made from any readily available radio-translucent material, such as any commercially available plastic material including but not limited to polystyrene, polyethylene, polymethyl methacrylate. Methods of forming plastic are well known.

Figure 2:
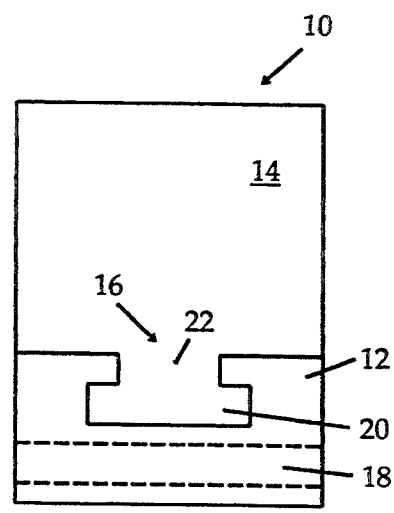
FIGS. 2–4 illustrate, in a front view, the device of FIG. 1, showing alternative configurations for the groove in the bite block.
Figure 3:
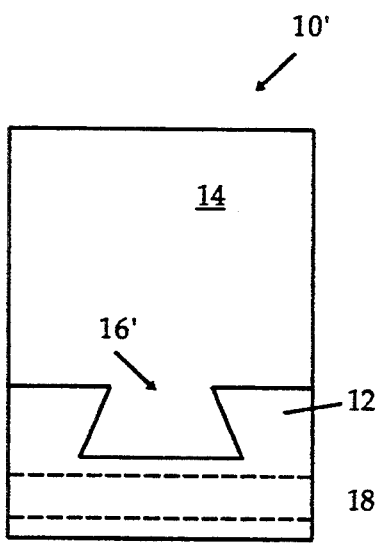
Figure 4:
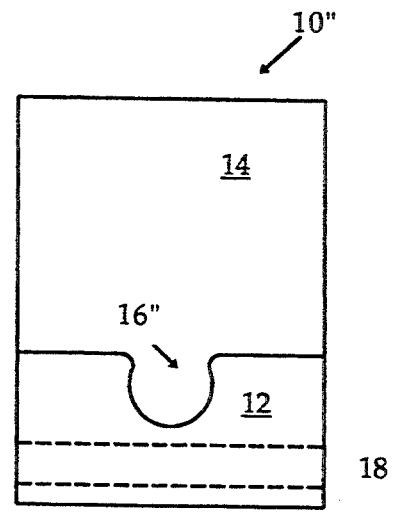

FIGS. 2–4 illustrate, in a front view, the device of FIG. 1, showing alternative configurations for the retentive groove in the bite block 12. The particular dimensions of the retentive groove are not critical other than the fact that they should be in proportion to the size of the bite block 12. In FIG. 2, the retentive groove 16 has bottom rectangular opening 20 and a smaller top rectangular opening 22 centered above the bottom opening 20. This shape of the retention groove prevents an interlocking piece (illustrated in FIG. 5) from being accidentally pulled away from the bite block 12 in the vertical direction. The retentive groove 16' in FIG. 3 also performs the same function, such that an interlocking piece (illustrated in FIG. 6) is prevented from being accidentally pulled away from the bite block. The configuration of retentive groove 16' simply shows the groove 16' having a top portion that is smaller than the bottom portion, wherein the sidewalls of the retentive groove 16' are angled at some manufacturably suitable angle to create the desired shape. Similarly, FIG. 4 illustrates yet another alternative retentive groove configuration, wherein the groove 16" has a circular shape with a top opening. The top opening of the groove 16" is smaller than the diameter of the groove such that an interlocking piece (illustrated in FIG. 7) cannot be accidentally pulled out. All of the foregoing configurations allow for a longitudinal movement of the interlocking piece along the retentive groove.

Figure 5:
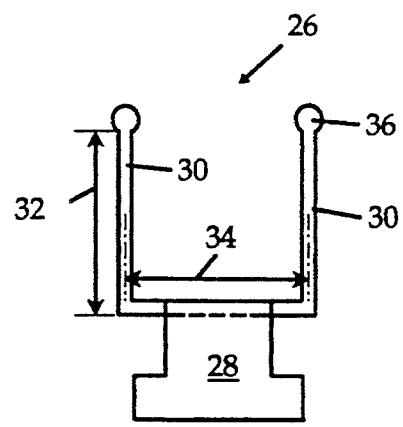
FIGS. 5–7 illustrate, in a front view, alternative distortion measurement tools for use in conjunction with the devices of FIGS. 2–4.
Figure 6:
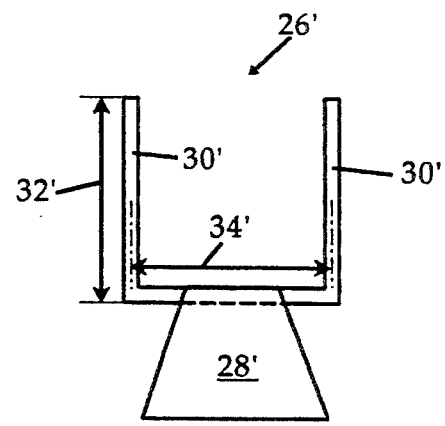
Figure 7:
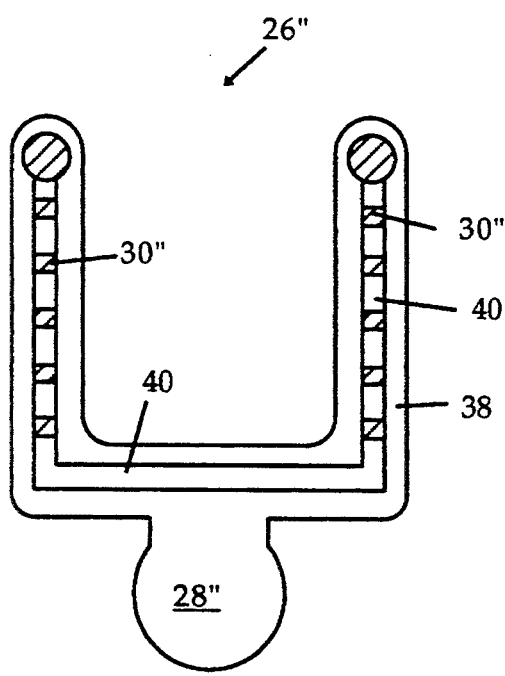

FIGS. 5–7 illustrate, in front views, alternative distortion measurement tools for use in conjunction with the devices of FIGS. 2–4. In FIG. 5, the distortion measurement tool 26 is composed of a radio-translucent support 28 and a set of radiopaque members 30 attached to the support 28. The support 28 is designed to fit into the retentive groove configuration 16, as previously shown in FIG. 2. The dimensions of the support 28 are dependent on the dimensions of the retentive groove. There should be a slight clearance between the support 28 and the retentive groove 16 such that the support is slidably movable along the track of the retentive groove. This sliding motion is important because it is desirable to position the radiopaque members 30 immediately in front of the tooth to be radiographed in order to accurately measure the amount of enlargement and distortion in the radiographic image.

The set of radiopaque members 30 can be made from stainless steel wires, although other corrosion-resistant radiopaque materials are also suitable. Each member 30 has a predetermined diameter and a predetermined height 32, as measured from the base of the vertical portion to the tip of the free end. The radiopaque members are placed at a predetermined distance 34 apart from each other so that they are parallel. Additionally, a circular radiopaque component 36 is disposed at the tip of the free end of each member 30. For example, a 1 mm diameter wire having a height of 20 mm may be used as the radiopaque members 30 which are placed 6 mm apart. The circular component 36 may be approximately 2 mm in diameter. These foregoing dimensions are only intended to be illustrative and not exclusive. The critical aspect in practicing the present invention is that the width or diameter of the member 30, its height 32, the spacing 34 between the members, and the diameter of the circular component are precisely known so that any changes in the dimensions as measured on the radiograph can be measured or calculated. It is anticipated that the radiopaque member may have a diameter substantially in a range of 0.5 to 2 mm and a height substantially in a range of 10 to 30 mm in a practical application of the present invention. Furthermore, an acceptable distance separating two radiopaque members falls substantially in a range from 5 to 15 mm. This range is actually only limited by intraoral access and patient comfort. Additionally, the circular component may have diameter ranging from approximately 1 to 3 mm.

Once the radiographic image is taken, the change in height of the radiopaque member as measured from the radiograph allows the dental practitioner to determine the foreshortening or elongation distortion in the image. Since the radiopaque members have fixed and known dimensions, the percent error of the measured dimensions on the radiographic image can be easily calculated based upon the change. Similarly, any measured change in the spacing between the two members enables the practitioner to calculate the mesio-distal distortion. Likewise, any change in the dimension of the circular component 36 allows the practitioner to determine the amount of enlargement in the radiographic image. The use of the circular component 36 is optional if magnification is not considered a factor. It is anticipated that a manufacturer of the device of the present invention can provide a permutation chart or table to the practitioner for a quick determination of the error factors.

FIG. 6 illustrates an alternative configuration for a distortion measurement tool 26'. The distortion measurement tool 26' is substantially similar to that shown in FIG. 5 with some minor variations. The support base 28' is shaped to fit into the retentive groove 16' of FIG. 3. Again, there should be some clearance in terms of dimension of the support base 28' and the groove 16' so that the support base may slide within the groove. The set of radiopaque members 30' are simply parallel wires of a known diameter and height which are disposed a known distance apart. There is no circular component at the tips of the free end to further simplify manufacturing of the distortion measurement tool.

FIG. 7 illustrates, in an enlarged view for clarity and ease of illustration, of yet another alternative configuration for a distortion measurement tool 26". The support base 28" is circular in shape to fit into the retentive groove 16" of FIG. 4. Again, there should be some clearance in terms of dimensions of the support base 28" and the groove 16" such that the support may slide within the groove yet cannot be accidentally pulled away from the bite block. In this embodiment a set of radiopaque spatial markers 30" and circular markers 36" are encapsulated within a radio-translucent encapsulant 38. The encapsulant 38 may be of the same material as the support base 28" so that the entire block may be manufactured in the same molding step. The spatial markers 30" and circular markers 36" can be any radiopaque materials, such as copper or aluminum. They are supported on a radio-translucent carrier 40, such as a polymer tape or an organic flexible film. The spatial markers 30" have to be patterned on the radio-translucent carrier 40 at set increments apart with the circular marker 36" being patterned at the tip of the top spatial marker. A set increment of 1 mm is envisioned to be most effective in practicing this embodiment of the invention, although a range of 1 to 3 mm is also acceptable. In effect, this embodiment envisions the creation of a ruler within the block so that measurements of the edentulous spacing and jawbone height can be easily measured and then compensated for any distortion or enlargement.

An alternative variation of a distortion measurement tool, not specifically illustrated, is one in which a very soft radiopaque member, such as a pure lead member, is encased within a deformable plastic. Since both the radiopaque member and the encapsulant are easily deformed, the dental practitioner may bend the radiopaque and its housing so as to lay against the gum of the patient before taking the radiograph. This practice would have the effect of more accurately reflecting the angle at which the x-ray beam hits the tooth and surrounding area.

Figure 8:
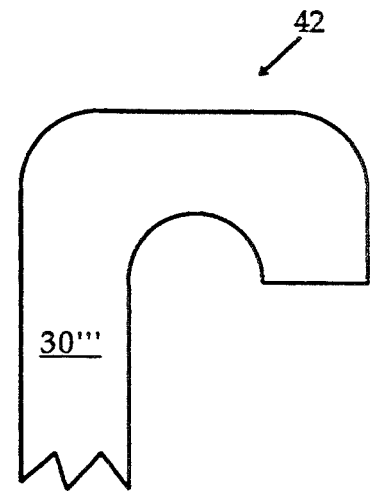
FIG. 8 illustrates an enlarged portion of a radiopaque member of a distortion measurement tool to show an alternative configuration for the free end of the member.

FIG. 8 illustrates in an enlarged view a tip portion of the radiopaque member 30''' of a distortion measurement tool. The free end is curved instead of being straight as previously illustrated in FIG. 6. Since the tool must fit inside a patient's mouth, it may be desirable to bend the free ends of the members into a J-shape or something similarly curved so as to not have sharp ends which can potentially cause patient discomfort. The patient's comfort factor may not be at issue in the case of a fully encapsulated member, so this variation would be most applicable to distortion measurement tools where the radiopaque markers are not encased in plastic.

Also in accordance with the present invention is a method for using the device for registering a dental radiograph. Accordingly, a device conforming to one of the above described embodiments is provided. A suitable amount of dental impression material, such as vinyl polysiloxane rubber, is placed on the bite block. The retentive groove on the bite block helps to retain the impression material in place since the material is still soft. It may be preferable to place the material abutting, or nearly abutting, the image receptor holder if the holder does not have a groove for holding an image receptor, such as an x-ray film, because the dental impression material itself may also be used to support and anchor the image receptor. The dental practitioner then places the device with the still soft dental impression material thereon onto a study model of a patient's teeth. The practitioner would orient the device to a minimal radiographic distortion position, taking into account the depth of palatal vault of the particular patient, the patient's bite, the location of the tooth to be radiographed, and whether a buccal or lingual view is desired. This step requires a judgment call for the practitioner based upon experience and training. However, it should be much easier for a dental practitioner to visualize on the study model as opposed to intraorally. Moreover, this step allows the dental practitioner to retain control over the placement of the bite block as opposed to depending on various operators and assistants who may each introduce human error with every radiographic image taken due to non-standardized placements of the bite block. Therefore, a much greater degree of accuracy is achieved with no patient discomfort in practicing the present invention.

Once an optimal position is determined, the dental practitioner would then allow the dental impression material to set or harden, thereby fixing the registration of the impression material on the patient's study model. A customized indexed bite block is thus created for the particular patient's teeth. An advantage to predetermining the indexed bite block prior to the taking of the radiograph is that it allows the practitioner to accurately locate the position of the bite block while working outside the patient's mouth. Moreover, the dental practitioner may have other personnel, such as a dental assistant, take the actual radiograph. Using a premade indexed bite block eliminates variations in the resulting dental radiographic image when taken by different operators. Also if orthodontics is necessary to create adequate space for an implant, then the present method allows a reproducible accurate relocation of the bite block inside the patient's mouth for subsequent x-rays which facilitates the practitioner's determination of changes in the patient's teeth as treatment progresses over time.

When a periapical dental radiograph of the patient's teeth is required, an image receptor, such as an x-ray film, is attached to the image receptor holder of the device. The device having the film thereon is then placed inside the patient's mouth. The set dental impression material is easily registered onto the patient's teeth in exactly the same orientation as previously determined by the dental practitioner on the study model. Hence, the positioning of the indexed bite block within the patient's mouth is one that yields minimal distortion in the radiographic image. The distortion measurement tool should be positioned as close to the patient's buccal gingival as possible to accurately reflect the enlargement of the resulting radiographic image. Magnification of the image is partly proportional to the distance between the object to be radiographed and the image receptor. Therefore, it is desirable to place the radiopaque members as close to the tooth and its apex as possible so that the magnification of the radiopaque members is the same as that of the tooth. Hence, if the distortion measurement tool is composed of very soft radiopaque members encased within pliable plastic material, then it would be desirable to lay the housing, and hence the radiopaque members against the buccal gingival to conform to its angle. The resulting image would more accurately reflect the angle, as viewed from a vertical plane, at which the x-ray beam hits the tooth. The dental radiograph may then be taken.

Once the dental radiograph is taken, it may be studied by the dental practitioner who can measure any distortion in the radiograph by using the radiopaque members or spatial markers provided by the distortion measurement tool. Since the dimensions of the members, such as the diameter or width, the height, and the spacing between two members, or the set increments between markers, are predetermined and known, any changes in the geometry of the members can be measured to yield the distortion information. Moreover, if the circular radiopaque components or markers are also present, the change in diameter of the circular components would indicate how much enlargement there is in the radiograph. It would be within the training of a dental practitioner of ordinary skill in the art to use the geometric information provided by the distortion measurement tool to obtain accurate dimensional measurements of jawbone height and edentulous spacing using either basic algebra or a table specifying percent error calculations in the vertical and horizontal planes as well as magnification.

As an optional step to the present method, it may be desirable to take other periapical radiographic images in which the radiographic source is not normal or perpendicular to the tooth. Once the first radiograph is taken wherein the radiographic source is normal to the tooth, a second radiograph may be taken where the radiographic source is rotated from a parallel position with respect to a longitudinal axis of the bite block to a predetermined angle, preferable less than 15° from the parallel position. In this manner, the dental practitioner may gain other valuable information from either a buccal or a lingual image of the same tooth and its apex.

The foregoing description and illustrations contained herein demonstrate many of the advantages associated with the present invention. In particular, it has been revealed that a device for registering a dental radiograph may be used by dental practitioners who need accurate dimensional information about a patient's teeth. The present invention offers significant improvements over the art in that it allows for a reproducible and controllable positioning of the bite block inside the patient's mouth independent of actual x-ray machine operators. An added benefit is that the dental practitioner can preplace the bite block on a study model to determine a position yielding the least amount of distortion in the resulting image. Moreover, the pre-placement step means that the actual patient care time required for taking the x-ray is reduced because the radiograph operator can quickly place the registered bite block into the patient's mouth without needing a repositioning. Practicing the present invention results in a much more accurate periapical radiograph than has been possible with existing practices. An additional benefit is that less retakes of radiographs will be required which translates into reduced radiation exposure for the patient. Additionally, a dental practitioner can measure the amount of distortion, both vertical and mesio-distal, and enlargement in the radiograph using dimensional gauges provided by the invention. Since distortion can be accurately measured with the present imaging technique, the use of more costly imaging techniques, such as a CT scan, an MRI or a denta-scan can be minimized. The device of the present invention is especially useful for preimplant measurements where jawbone height and edentulous spacing are critical to a successful treatment.

Thus it is apparent that there has been provided, in accordance with the invention, a device for registering a dental radiograph and a method for using the same that fully meet the need and advantages set forth previously. Although the invention has been described and illustrated with reference to specific embodiments thereof, it is not intended that the invention be limited to these illustrative embodiments. Those skilled in the art will recognize that modifications and variations can be made without departing from the spirit of the invention. For example, variations in the dimensions of the distortion measurement tool including its radiopaque members or markers are possible to create different groups of tool sizes, which is advantageous because patients' mouths differ in size. Thus, it may be more desirable to have a smaller measurement tool for a child's mouth and a larger one for an adult's mouth. In addition, the invention is not limited to having separate radiopaque members attached to the support base. The radiopaque members can be made from a single wire formed into an appropriate shape such that there are two parallel wires. Alternatively, two separate radiopaque members can be attached to the base in a manner such that they are parallel to each other. It is also important to note that the present invention is not limited in any way to any particular type of sliding mechanism for the support base within the retentive groove. The support base movement can be a smooth and continuous sliding motion with an infinite number of positions along the retentive groove, or it may be ratcheted to preset positions in the groove. Therefore, it is intended that this invention encompass all such variations and modifications falling within the scope of the appended claims.

I claim:

1. A device for registering a dental radiograph, comprising:
   a bite block having a retentive groove along a length of the bite block;
   distortion measurement means for measuring distortion in the dental radiograph, wherein said distortion measurement means is slidably movable within the retentive groove of the bite block; and
   an image receptor holder attached to a distal end of the bite block as viewed from a radiographic source.

2. The device of claim 1, wherein said distortion measurement means comprises a set of radiopaque members attached to a sliding support which fits into the retentive groove of the bite block, wherein each member of the set of radiopaque members has a predetermined diameter and a predetermined height and is placed at a predetermined distance apart from each other.

3. The device of claim 2, wherein the set of radiopaque members is composed of a stainless steel wire having a diameter substantially in a range of 0.5 to 2 mm.

4. The device of claim 2, wherein each member of the set of radiopaque members has a curved free end to provide patient comfort.

5. The device of claim 2, further comprising a circular radiopaque component at a free end of each member of the set of radiopaque members for measuring image enlargement in the dental radiograph, wherein the circular radiopaque component has a diameter substantially in a range of 1 to 3 mm.

6. The device of claim 2, wherein the height of each member of the set of radiopaque members is substantially in a range of 10 to 30 mm and wherein the distance between the radiopaque members is substantially in a range from 5 to 15 mm.

7. The device of claim 1, wherein said distortion measurement means comprises a radio-translucent member having a sliding support which fits into the retentive groove of the bite block, the radio-translucent member having a set of radiopaque spatial markers incorporated therein, wherein the set of radiopaque spatial markers has a plurality of individual markers set at a predetermined distance vertically and horizontally apart from each other.

8. The device of claim 7, wherein the set of radiopaque spatial markers of said distortion measurement means is further characterized as having a circular radiopaque marker as a top spatial marker for measuring enlargement of the dental radiograph.

9. The device of claim 8, wherein the circular radiopaque marker has a diameter substantially in a range of 1 to 3 mm and wherein the distance between the radiopaque spatial markers is approximately 1 mm.

10. The device of claim 1, wherein the groove of the bite block has a top portion being smaller than a bottom portion, such that the distortion measurement means is constrained to only a slidable motion along a length of the retentive groove.

11. The device of claim 1, wherein the retentive groove of the bite block comprises a bottom rectangular opening and a smaller top rectangular opening centered above the bottom rectangular opening such that the distortion measurement means is constrained to only a slidable motion along a length of the retentive groove.

12. The device of claim 1, wherein the retentive groove of the bite block has a circular shape with a top opening smaller than a diameter of the circular shape, such that the distortion measurement means is constrained to only a slidable motion along a length of the retentive groove.

13. A method for taking a dental radiograph with a distortion measurement capability in a patient's mouth, comprising the steps of:
providing a device for registering a dental radiograph comprising:
a bite block having a retentive groove along a length of the bite block;
distortion measurement means for measuring distortion in the dental radiograph, wherein said distortion measurement means is slidably movable within the retentive groove of the bite block; and
an image receptor holder attached to a distal end of the bite block as viewed from a radiographic source;
placing dental impression material on the bite block, wherein the retentive groove retains the dental impression material in place;
placing the device with the dental impression material thereon on a study model of a patient's teeth to orient the device to a minimal radiographic distortion position;
allowing the dental impression material to set in the position on the study model to create a customized indexed bite block for the patient's teeth;
attaching an image receptor to the image receptor holder;
placing the device having the customized indexed bite block into the patient's mouth, wherein the minimal radiographic distortion position is provided by the dental impression material which was set on the study model; and
taking the dental radiograph, wherein said distortion measurement means allows any distortion of the patient's teeth to be accurately determined.

14. The method of claim 13, wherein the step of placing dental impression material comprises placing a vinyl polysiloxane rubber onto the bite block.

15. The method of claim 13, wherein the step of providing the device comprises providing said device having a set of radiopaque members attached to a sliding support fitting into the groove of the bite block as the distortion measurement means, wherein each member of the set of radiopaque members has a predetermined diameter and a predetermined height and is disposed at a predetermined distance apart from each other.

16. The method of claim 15, wherein the step of providing the device having the set of radiopaque members further comprises providing a circular radiopaque marker disposed at a free end of a radiopaque member for measuring enlargement of the dental radiograph.

17. The method of claim 13, wherein the step of providing the device comprises providing said device having a radio-translucent member having a sliding support fitting into the retentive groove of the bite block as the distortion measurement means, wherein the radio-translucent member has a set of radiopaque spatial markers incorporated therein, the set of radiopaque spatial markers having a plurality of individual markers set at a predetermined distance vertically and horizontally apart from each other.

18. The method of claim 17, wherein the step of providing the device having the set of radiopaque markers further comprises providing a circular radiopaque marker as a top spatial marker for measuring enlargement of the dental radiograph.

19. The method of claim 17, further comprising the step of:
positioning the radio-translucent member and radiopaque spatial markers encased therein against a contour of a gingival portion of the patient's mouth prior to the step of taking the dental radiograph.

20. The method of claim 13, further comprising the steps of:
rotating the radiographic source from a parallel position with respect to a longitudinal axis of the bite block to a predetermined angle less than 15° from the longitudinal axis; and
taking a second dental radiograph.

* * * * *